United States Patent [19]
Becky

[11] 3,836,839
[45] Sept. 17, 1974

[54] CONTROLLED APPARATUS FOR SILICON CONTROLLED RECTIFIERS

[75] Inventor: Raymond Becky, McKeesport, Pa.
[73] Assignee: TUC Industries, Inc., Hickory, Pa.
[22] Filed: Nov. 14, 1972
[21] Appl. No.: 306,193

[52] U.S. Cl.............. 323/20, 307/291, 323/22 SC, 321/18
[51] Int. Cl............................................. G05f 1/56
[58] Field of Search .............. 323/20, 22 T, 22 DC; 307/296, 297

[56] References Cited
UNITED STATES PATENTS
| | | | |
|---|---|---|---|
| 3,517,301 | 6/1970 | Huber | 323/20 |
| 3,538,423 | 11/1970 | Gozeniewski | 323/20 X |
| 3,564,388 | 2/1971 | Nolf | 321/18 |
| 3,602,804 | 8/1971 | Randall | 323/20 |
| 3,670,234 | 6/1972 | Joyce | 321/18 |

OTHER PUBLICATIONS
Lambda March 1971 Catalog Supplement, Page 4, Relied upon.

*Primary Examiner*—Gerald Goldberg
*Attorney, Agent, or Firm*—Buell, Blenko & Ziesenheim

[57] ABSTRACT

Control apparatus for controlled rectifier battery chargers and battery eliminators includes a reference voltage source, error amplifiers for voltage and current control, apparatus comparing error voltage with a ramp voltage synchronized with the power line frequency, and apparatus triggered by the voltage comparator generating a train of gating pulses for silicon controlled rectifiers and the like.

2 Claims, 1 Drawing Figure

PATENTED SEP 17 1974　　　　　　　　　　　　　　　3,836,839
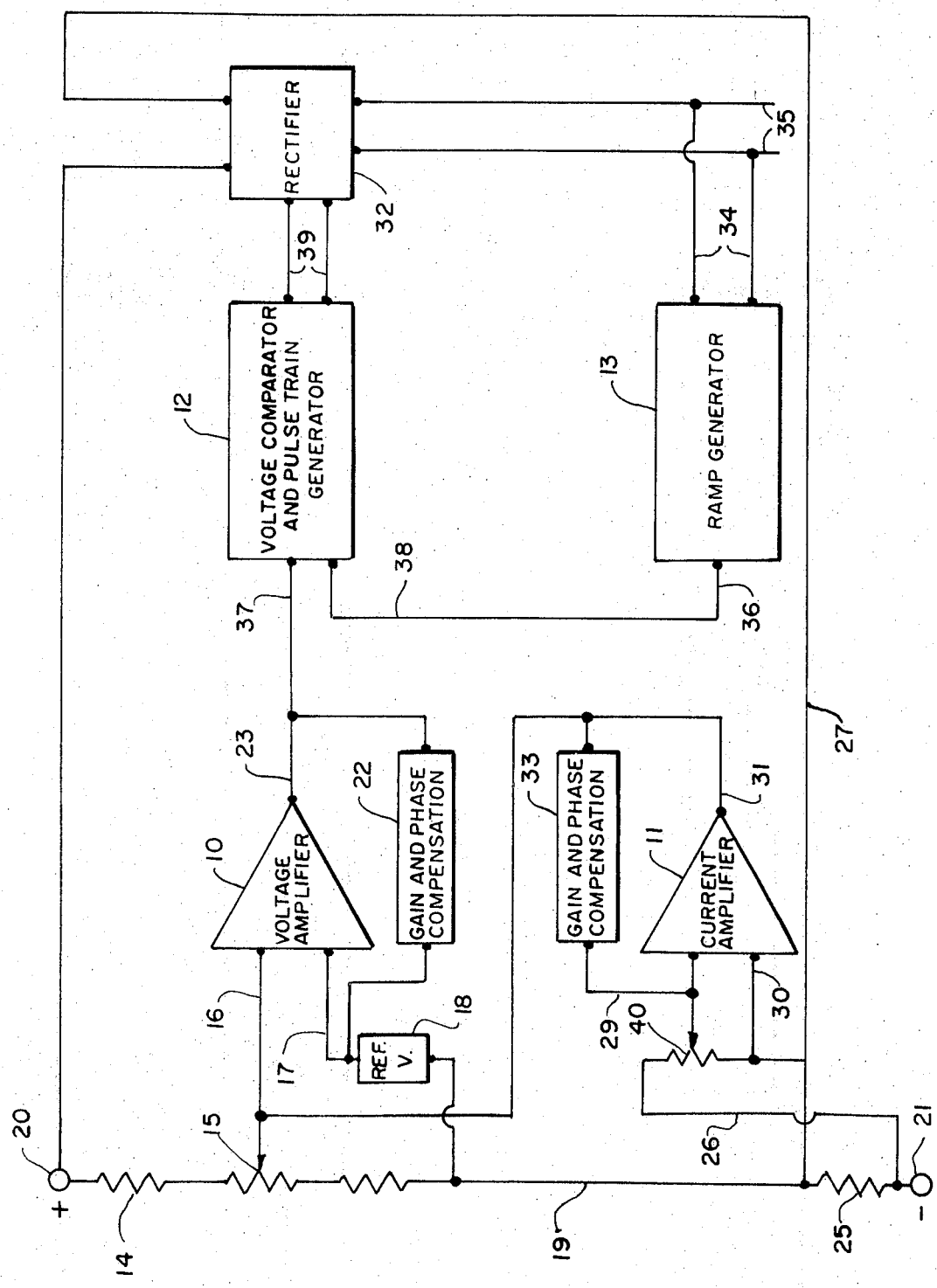

CONTROLLED APPARATUS FOR SILICON CONTROLLED RECTIFIERS

This invention relates to control apparatus for silicon controlled rectifiers. It is more particularly concerned with such control apparatus which is sensitive both to output voltage changes and output current changes of battery chargers and battery eliminators having outputs variable over wide ranges.

Various types of circuits have been employed for control of silicon controlled rectifiers used in battery chargers and battery eliminators. In general, these are designed to operate at a single nominal voltage and over a rather restricted current range, and require replacement of circuit elements when that voltage or current range is changed. Circuits having current control require a current sensing resistor which, prior to my invention to be described, likewise had to be changed when operating requirements were changed. Those circuits generally did not provide full range control of firing angle from 0° to 180°, and exhibited loop instability when they were disconnected from a battery.

It is an object of my invention, therefore, to provide control apparatus which is operative over a wide range of output voltages and currents without requiring any replacement or substitution of circuit elements. It is another object to provide such a control circuit which provides constant regulation regardless of the nominal voltage of the output. It is another object to provide such a control circuit which requires no discrete current sensing resistor. Other objects of my invention will appear in the course of the description thereof which follows.

My invention comprises both current and voltage sensing and amplifying means, means for comparing the outputs thereof with a saw-tooth voltage generated by a ramp generator synchronized with the power line voltage, and a pulse train generator triggered by the difference between the compared voltages. It will be described hereinafter with reference to the attached figure which is a block schematic of the embodiment of my apparatus presently preferred by me.

The major components of my apparatus are a voltage amplifier 10 and current amplifier 11, a voltage comparator and pulse generator 12 and a ramp generator 13. The silicon controlled rectifier assembly to be controlled, indicated by reference character 32, is not in itself a part of my invention and is conventional. Voltage amplifier 10 and current amplifier 11 are conventional operational amplifiers.

The control voltage input to my voltage amplifier 10 is derived from a voltage divider 14 which is connected across terminals 20 and 21, the positive and negative output terminals respectively of the rectifier 32. In operation this rectifier is, of course, connected to a battery if it is operating as a battery charger. The voltage divider 14 includes a potentiometer 15 the slider of which is connected to first input 16 of voltage amplifier 10. A reference voltage source 18 is connected to the second input 17 of voltage amplifier 10. This reference voltage is made equal to the lowest voltage the battery is likely to exhibit and is conveniently derived from a Zener diode. The other ends both of the voltage divider 14 and reference voltage source 18 are connected by conductor 19 to one input terminal of the current amplifier to the described. Voltage amplifier 10 is provided with gain and phase compensating elements 22 bridged between its output 23 and second input 17. Output 23 is connected to first input 37 of a voltage comparator and pulse generator to be described.

The control voltage input to current amplifier 11 is derived from a resistor 25 in the lead to output terminal 21. This resistor need not be a discrete element but merely a length of the output busbar. A control potentiometer 40 is connected across resistor 25 by leads 26 and 27 and the slider of potentiometer 40 is connected to first input 29 of current amplifier 11. The second input 30 is connected to lead 27. Output 31 of current amplifier 11 is connected to first input 16 of voltage amplifier 10. Lead 27 is connected to one output terminal of silicon controlled rectifier assembly 32. Current amplifier 11 is also provided with gain and phase compensation elements 33 bridged between its input 29 and output 31.

Ramp generator 13 is synchronized to the power line frequency through leads 34 which connect with the power line 35. The output 36 of ramp generator 13 is connected to second input 38 of voltage comparator and pulse train generator 13. Ramp generator 13 generates a saw-tooth wave of the same frequency as the power line.

Voltage comparator and pulse train generator 12 is a multivibrator which is triggered by a low input voltage and generates a train of approximately rectangular pulses which may be the frequency of the power line or a multiple of that frequency. Its output is connected by leads 39 to the control terminals of the silicon controlled rectifier assembly 32.

The operation of my apparatus will be described also with reference to the FIGURE. The control voltage to input 16 of voltage amplifier 10 is obtained from potentiometer 15 which is set in accordance with the output voltage desired from rectifier 32 so as to supply a control voltage to input 16 which is not less than the reference voltage applied to input 17 by reference voltage source 18. The difference between the voltage from potentiometer 15 and the reference voltage from source 18 is the error voltage which is amplified by voltage amplifier 10. If the voltages from potentiometer 15 and reference source 18 are equal, the error voltage is zero and the apparatus is charging at the desired voltage. The output of voltage amplifier 10 is a direct current voltage which is applied to input 37 of voltage comparator and pulse train generator 12. The compensating network 22 is adjusted to correct any tendency of amplifier 10 to motorboat.

The control voltage to input 29 of current amplifier 11 is derived from the voltage drop across resistor 25. Potentiometer 40 is adjusted in accordance with the output desired from rectifier 32 in the same way as potentiometer 15 to apply a suitable fraction of the voltage drop across resistor 25 to input 29 of current amplifier 11. The output 31 of that amplifier is connected to input 16 of voltage amplifier 10. As the output voltage of current amplifier 11 is that between its output terminal 31 and conductor 27 and the voltage derived from potentiometer 15 is that between its slider and conductor 27, those voltages are applied in parallel to input 16 of voltage amplifier 10. If the output voltage of amplifier 11 is lower than that from potentiometer 15, it has no effect on amplifier 10. Compensating network 33 is adjusted in the same way as network 22 above described.

The ramp function or saw-tooth wave from output 36 of ramp generator 13 is supplied to input 38 of voltage comparator and pulse generator 12 and the output 23 of voltage amplifier 10 is applied to input 37 of that comparator. The time in the cycle at which the multivibrator is triggered is that at which the magnitude of the ramp voltage exceeds that of the voltage from voltage amplifier 10. When the multivibrator is triggered it delivers a train of rectangular pulses which are conducted by leads 29 to the control circuit of rectifier assembly 32.

My apparatus when used as a battery charger is stable if the battery is disconnected. If this should happen the current through resistor 25 drops to zero as does the voltage applied to input 29 of current amplifier 11 and the output voltage of that amplifier. The control voltage applied by potentiometer 15 to input 16 of voltage amplifier 10 tends to rise above the value of the reference voltage from source 18, thus increasing the output voltage from amplifier 10 which is supplied to voltage comparator and pulse train generator 12. The higher this voltage is the smaller is the portion of the cycle over which the multivibrator of the pulse train generator is triggered and delivers pulses to fire the controlled rectifier in assembly 32, and therefore the lower is the voltage output from that rectifier.

By the use of my apparatus voltages from a few volts to hundreds of volts and currents from milliamperes to hundreds of amperes can be provided by a single silicon controlled rectifier. Voltage control potentiometer 15 and current control potentiometer 40 need merely be set so as to produce the desired output.

The amplifiers and other major components described herein may conveniently be in the form of integrated circuits.

While I have referred to silicon controlled rectifiers in the foregoing description, my invention is equally suitable with use for other thyristors such as triacs, and all similar gated rectifiers, and I include them under the designation of silicon controlled rectifiers. I have described control apparatus for single phase circuits but it is easily adapted to multiphase circuits.

In the foregoing specification I have described a presently preferred embodiment of this invention, however, it will be understood that this invention can be otherwise embodied within the scope of the following claims.

I claim:

1. In an apparatus for producing gate firing pulses for a silicon controlled rectifier or the like, including a pulse train generator, a ramp voltage generator synchronized with the power line frequency and means for applying the ramp voltage to the input of the pulse train generator adjusted to trigger the pulse train generator when the ramp voltage exceeds a control voltage also applied to the input of the pulse train generator, the improvement comprising means for deriving a control error voltage proportional to the difference between a portion of the output voltage of the rectifier and a reference voltage, those means including a potentiometer connected across the output of the rectifier, means for deriving a control error voltage proportional to the output current of the rectifier, those means including a resistor adapted to be connected at one end to a load and at the other end to one junction of the potentiometer and rectifier output, and operational amplifier means having both control error voltages applied in parallel to one input and its output connected to the input of the pulse train generator.

2. Apparatus of claim 1 in which the reference voltage is connected to the other input of the operational amplifier.

* * * * *